US012437078B2

(12) United States Patent
Rafikov et al.

(10) Patent No.: US 12,437,078 B2
(45) Date of Patent: Oct. 7, 2025

(54) SIMULATING A RANSOMWARE ATTACK IN A TESTING ENVIRONMENT

(71) Applicant: Dell Products L.P., Round Rock, TX (US)

(72) Inventors: Rustem Rafikov, Hopkinton, MA (US); Philippe Armangau, Kalispell, MT (US); Sathya Krishna Murthy, Morrisville, NC (US); Christopher Jones, Plainville, MA (US); Bruce A. Zimmerman, Concord, MA (US)

(73) Assignee: Dell Products L.P., Round Rock, TX (US)

( * ) Notice: Subject to any disclaimer, the term of this patent is extended or adjusted under 35 U.S.C. 154(b) by 191 days.

(21) Appl. No.: 18/141,616

(22) Filed: May 1, 2023

(65) Prior Publication Data

US 2024/0370567 A1 Nov. 7, 2024

(51) Int. Cl.
G06F 21/57 (2013.01)
(52) U.S. Cl.
CPC ...... G06F 21/577 (2013.01); *G06F 2221/033* (2013.01)
(58) Field of Classification Search
CPC ................ G06F 21/557; G06F 2221/033
See application file for complete search history.

(56) References Cited

U.S. PATENT DOCUMENTS

| 10,609,066 B1 | 3/2020 | Nossik et al. |
| 10,769,032 B2 | 9/2020 | O'Mahony et al. |
| 11,182,321 B2 | 11/2021 | Pinho et al. |
| 11,513,688 B2 | 11/2022 | Wang et al. |
| 11,768,936 B2 | 9/2023 | Herman et al. |
| 11,782,604 B2 | 10/2023 | Han et al. |
| 2018/0262529 A1* | 9/2018 | Allen .................... G06F 21/566 |
| 2022/0291986 A1* | 9/2022 | Klein .................... G06F 3/0604 |
| 2024/0143759 A1* | 5/2024 | Jindal .................... G06F 21/568 |
| 2024/0348618 A1* | 10/2024 | Arora .................... G06T 7/0002 |

FOREIGN PATENT DOCUMENTS

WO WO-2024178581 A1 * 9/2024 ............... H04L 9/40

OTHER PUBLICATIONS

Raul Reinosa Simon • Clara I. Valero • Jose A. Martinez Cadenas; Empirical Analysis and Practical Assessment of Ransomware Attacks to Data in Motion; 2024 IEEE International Conference on Cyber Security and Resilience (CSR) (2024, pp. 216-221); (Year: 2024).*

(Continued)

*Primary Examiner* — Luu T Pham
*Assistant Examiner* — Chao Wang
(74) *Attorney, Agent, or Firm* — BainwoodHuang

(57) ABSTRACT

A technique is directed to simulating a ransomware attack in a testing environment. The technique involves obtaining access to a testing environment in which to perform a simulated ransomware attack. The technique further involves, after obtaining access to the testing environment, loading prepared data into the testing environment. The technique further involves performing, as the simulated ransomware attack, a set of input/output (IO) operations based on a set of IO traces corresponding to an actual ransomware attack, the set of IO operations accessing the prepared data.

19 Claims, 5 Drawing Sheets

(56) References Cited

OTHER PUBLICATIONS

En Jie Tan • Kowit Tan • Royce Yu Feng Chong; Simulation of Pre-Ransomware Attacks on Active Directory; 2024 17th International Conference on Security of Information and Networks (SIN) (2024, pp. 1-9); (Year: 2024).*

Chengyue Wang • Yang Liu • Yaojun Qiao • Daoqi Han • Yueming Lu; Optimization Design of Network Attack and Defense Scenarios in Intelligent Clusters; 2024 IEEE 9th International Conference on Data Science in Cyberspace (DSC) (2024, pp. 154-161); (Year: 2024).*

* cited by examiner

SIMULATING A RANSOMWARE ATTACK IN A TESTING ENVIRONMENT

BACKGROUND

Ransomware is malicious software that prevents access to stored data. During a ransomware attack, ransomware scripts attempt to access and encrypt the data, rendering the data unreadable to authorized users.

Typically, a ransom note is left, demanding substantial sums of money for a key that can decrypt the data. However, even after paying a ransom, there is no guarantee that the data can be recovered.

SUMMARY

To protect against ransomware attacks, a system may monitor operations in an attempt to identify a ransomware attack. In response to identifying a ransomware attack, the system attempts to contain the ransomware attack or mitigate its effects.

Unfortunately, there are deficiencies in current approaches to testing ransomware protection tools. Typically, it is undesirable to test these tools using live ransomware due to the risks associated with running live ransomware. However, there is no guarantee that a conventional simulation will accurately reflect the actions of the live ransomware. Moreover, some conventional simulations are designed to run on only certain kinds of systems, such as data storage systems running a particular operating system. As a result, ransomware protection tools may be limited in effectiveness or even unusable on certain systems.

In contrast to the above-described conventional approaches to testing ransomware protection tools, improved techniques are directed to simulating a ransomware attack using traces of input/output (IO) activity (hereinafter "IO traces") acquired during an actual ransomware attack. These IO traces enable a simulator to perform a simulated ransomware attack without running potentially harmful ransomware. Instead, the simulator reads and writes data having data characteristics based on those recorded in the IO traces. These data characteristics may include size, entropy, dedupability, and other data characteristics indicative of the actual ransomware attack. Moreover, these data characteristics may be platform agnostic, enabling the simulator to perform a simulated ransomware attack regardless of the type of system affected by the actual ransomware attack.

One embodiment is directed to a method of simulating a ransomware attack. The method includes obtaining access to a testing environment in which to perform a simulated ransomware attack. The method further includes, after obtaining access to the testing environment, loading prepared data into the testing environment. The method further includes performing, as the simulated ransomware attack, a set of input/output (IO) operations based on a set of IO traces corresponding to an actual ransomware attack, the set of IO operations accessing the prepared data.

Another embodiment is directed to electronic circuitry which includes memory and control circuitry coupled with the memory. The memory stores instructions which, when carried out by the control circuitry, cause the control circuitry to perform a method of:

(A) obtaining access to a testing environment in which to perform a simulated ransomware attack;

(B) after obtaining access to the testing environment, loading prepared data into the testing environment; and (C) performing, as the simulated ransomware attack, a set of input/output (IO) operations based on a set of IO traces corresponding to an actual ransomware attack, the set of IO operations accessing the prepared data.

Yet another embodiment is directed to a computer program product having non-transitory computer readable medium which stores a set of instructions to simulate a ransomware attack. The set of instructions, when carried out by computerized circuitry, causes the computerized circuitry to perform a method of:

(A) obtaining access to a testing environment in which to perform a simulated ransomware attack;

(B) after obtaining access to the testing environment, loading prepared data into the testing environment; and (C) performing, as the simulated ransomware attack, a set of input/output (IO) operations based on a set of IO traces corresponding to an actual ransomware attack, the set of IO operations accessing the prepared data.

In some arrangements, the method further includes obtaining, from the set of IO traces, an entropy measure of data written during the actual ransomware attack. Additionally, the method further includes generating, based on the entropy measure, input data simulating the data written during the actual ransomware attack. Additionally, performing the set of IO operations includes writing the input data into storage of the testing environment.

In some arrangements, the method further includes obtaining, from the set of IO traces, a deduplication measure of data written during the actual ransomware attack. Additionally, the method further includes generating, based on the deduplication measure, input data simulating the data written during the actual ransomware attack. Additionally, performing the set of IO operations includes writing the input data into storage of the testing environment.

In some arrangements, the set of IO traces is acquired from a first platform running a first operating system (OS). Additionally, performing the set of IO operations includes performing the set of IO operations on, as the testing environment, a second platform running a second OS that is a different OS than the first OS.

In some arrangements, the method further includes obtaining, from the set of IO traces, data characteristics of read data stored prior to the actual ransomware attack. Additionally, the method further includes generating the prepared data based on the data characteristics to support proper access when performing a read operation based on the set of IO traces.

In some arrangements, obtaining the data characteristics includes obtaining, as a data characteristic, an entropy measure of the read data.

In some arrangements, obtaining the data characteristics includes obtaining, as a data characteristic, a deduplication measure of the read data.

In some arrangements, the prepared data includes multiple portions of data each based on a respective read request recorded in the set of IO traces. Additionally, the method further includes collating the multiple portions of data to generate a set of collated data. Additionally, loading the prepared data includes loading, as at least part of the prepared data, the set of collated data into the testing environment.

In some arrangements, the method further includes, in response to exceeding the predetermined collation threshold, issuing a request to load, as at least part of the prepared data, the set of collated data into the testing environment.

In some arrangements, the set of IO traces define a plurality of sequential IO requests issued during the prior ransomware attack. Additionally, performing the IO operations includes:
(i) generating a set of collated IO requests having an order of access based on the plurality of sequential IO requests, the set of collated IO requests including fewer IO requests than the plurality of IO requests; and
(ii) issuing, during the simulated ransomware attack, the set of collated IO requests in the testing environment.

In some arrangements, the plurality of sequential IO requests includes a plurality of sequential read requests. Additionally, generating the set of collated IO requests includes collating the set of sequential read requests to generate a collated read request.

In some arrangements, the plurality of sequential IO requests includes a plurality of sequential write requests. Additionally, generating the set of collated IO requests includes collating the plurality of sequential write requests to generate a collated write request.

In some arrangements, write requests in plurality of sequential write requests are directed to different respective storage locations. Additionally, the sequential IO requests further include a second plurality of sequential write requests directed to a same storage location. Additionally, performing the set of IO operations further includes issuing multiple write requests to store write data of the second plurality of write requests.

In some arrangements generating the set of collated IO requests includes:
(i) collating the sequential IO requests to generate a collated IO request having an IO size exceeding a predetermined size threshold; and
(ii) in response to the IO size exceeding the predetermined size threshold, issuing the collated IO request in the testing environment.

Other embodiments are directed to electronic systems and apparatus, processing circuits, computer program products, and so on. Some embodiments are directed to various methods, electronic components and circuitry which are involved in simulating a ransomware attack. Certain embodiments are directed to various methods, electronic components, and circuitry which are involved in simulating a ransomware attack.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to simulating a ransomware attack using traces of input/output (IO) activity (hereinafter "IO traces") acquired during an actual ransomware attack. These IO traces enable a simulator to perform a simulated ransomware attack without running the ransomware used in the actual ransomware attack. Instead, the simulator reads and writes data having data characteristics based on those recorded in the IO traces. These data characteristics may include size, entropy, dedupability, and other data characteristics indicative of the actual ransomware attack. Moreover, these data characteristics may be platform agnostic, enabling the simulator to perform a simulated ransomware attack regardless of the type of system affected by the actual ransomware attack.

It should be appreciated that a simulator may perform IO operations that closely match access patterns recorded in the IO traces acquired during an actual ransomware attack. IO traces are records of data storage operations. In some arrangements, IO traces include timestamps and sizes of data storage operations conducted during the actual ransomware attack. In some arrangements, the IO traces also indicate how data was processed during the actual ransomware attack, including measures of deduplication or compression performed on the data. As will be described in further detail below, these data characteristics enable a simulation to accurately match the actual ransomware attack.

Moreover, these IO traces enable a simulator to perform simulated ransomware attacks in a wide range of testing environments. In some arrangements, IO traces include data characteristics that are not system dependent. It should be appreciated that these data characteristics are not reliant on low-level operating system (OS) functions and do not require system-specific privileges. Using these data characteristics, a resulting simulation may be platform agnostic, i.e., IO traces acquired from a platform running a particular OS may be used in a testing environment running a different OS. One such testing environment will now be provided with reference to FIG. 1.

Figure 1:
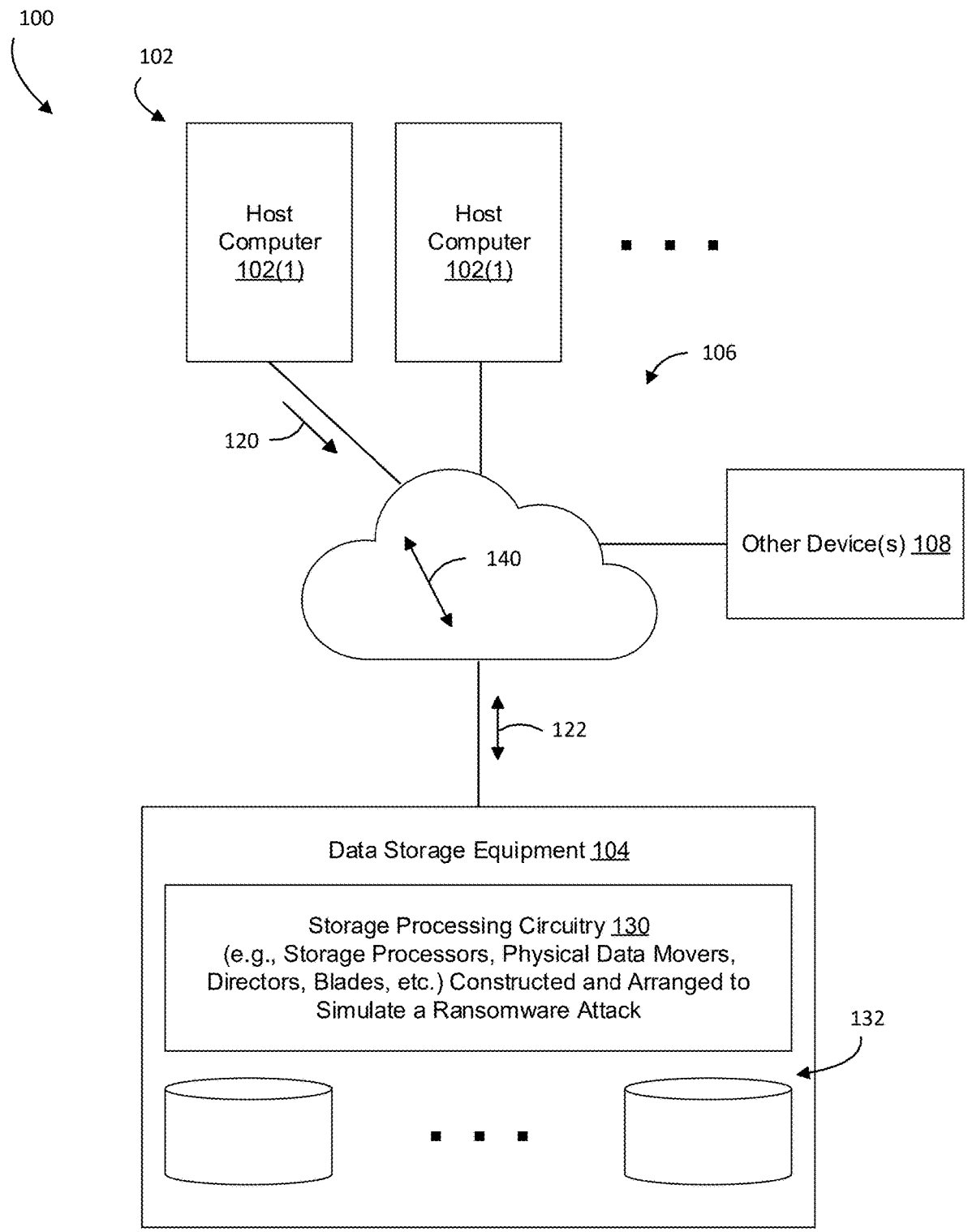
FIG. 1 is a block diagram of a testing environment which simulates a ransomware attack in accordance with certain embodiments.

FIG. 1 shows a testing environment 100 in which a simulated ransomware attack may be performed in accordance with certain embodiments. The testing environment 100 includes host computers 102(1), 102(2), . . . (collectively, host computers 102), data storage equipment 104, and a communications medium 106, and perhaps other devices 108.

Each host computer 102 simulates an actual host computer and is constructed and arranged to perform useful work. For example, one or more of the host computers 102 may operate as a file server, a web server, an email server, an enterprise server, a database server, a transaction server, combinations thereof, etc. which provides host IO requests 120 to the data storage equipment 104. In this context, the host computers 102 may provide a variety of different IO requests 120 (e.g., block and/or file based write commands, block and/or file based read commands, combinations thereof, etc.) that direct the data storage equipment 104 to richly and reliably store host data 122 within and retrieve host data 122 from storage (e.g., primary storage or main memory, secondary storage, tiered storage, combinations thereof, etc.).

The data storage equipment 104 (e.g., a storage array, a storage system, etc.) includes storage processing circuitry 130 and storage devices 132. The storage processing circuitry 130 is constructed and arranged to respond to the host IO requests 120 from the host computers 102 by writing data into the storage devices 132 and reading the data from the storage devices 132.

The storage processing circuitry 130 may include one or more physical storage processors (SPs) or engines, data movers, director boards, blades, IO modules, storage device controllers, switches, other hardware, combinations thereof, and so on. The storage devices 132 provide persistent/non-volatile storage in accordance with one or more RAID data protection schemes and may include one or more types of storage drives, e.g., non-volatile random access memory (NVRAM) devices, solid state drives (SSDs), hard disk drives (HDDs), combinations thereof, and so on.

In accordance with certain embodiments, at least some of the storage devices 132 provide non-volatile storage using a mapped-RAID architecture. Moreover, in accordance with certain embodiments, various physical componentry may be virtualized for additional flexibility, fault tolerance, load balancing, and so on (e.g., virtual data movers, virtual storage devices, etc.).

The communications medium 106 is constructed and arranged to connect the various components of the testing environment 100 together to enable these components to exchange electronic signals 140 (e.g., see the double arrow 140). At least a portion of the communications medium 106 is illustrated as a cloud to indicate that the communications medium 106 is capable of having a variety of different topologies including backbone, hub-and-spoke, loop, irregular, combinations thereof, and so on. Along these lines, the communications medium 106 may include copper-based data communications devices and cabling, fiber optic devices and cabling, wireless devices, combinations thereof, etc. Furthermore, the communications medium 106 is capable of supporting LAN-based communications, SAN-based communications, cellular communications, WAN-based communications, distributed infrastructure communications, other topologies, combinations thereof, etc.

The other devices 108 represent other possible componentry of the testing environment 100. Along these lines, the other devices 108 may include remote data storage equipment that provides data to and/or receives data from the data storage equipment 104 (e.g., replication arrays, backup and/or archiving equipment, service processors and/or management/control devices, combinations thereof, etc.).

It should be appreciated that testing environment 100 is provided by way of example only and that other configurations are also possible. For example, one or more components of testing environment 100 may be implemented via a virtual machine, while other components of testing environment 100 may be physical hardware. Additionally or alternatively, a single device may be configured to operate as multiple components of testing environment 100. Testing environment 100 may also be a sandbox.

During operation, the storage processing circuitry 130 reads and writes data having the same or similar data characteristics as those obtained from a set of IO traces acquired during an actual ransomware attack. In this manner, the storage processing circuitry 130 safely performs a simulated ransomware attack without running the ransomware used in the actual ransomware attack and without needing access to user data affected by the actual ransomware attack. As described in further detail below, the data characteristics captured in the IO traces may include size, entropy, dedupability, and other data characteristics indicative of the actual ransomware attack.

In certain embodiments, the data characteristics include a size measure. For example, a particular type of ransomware may involve reading and writing large amounts of data in a short amount of time in an attempt to quickly restrict access, triggering a sudden increase in data access. Another type of ransomware may involve stealthily encrypting data over a longer time period in an attempt to avoid detection. IO traces that reflect these features may be used to generate simulated ransomware attacks that accurately match the access patterns of a variety of different ransomware attacks.

In certain embodiments, the data characteristics include a dedupability measure, i.e., a measure of how much deduplication was performed to reduce the number of duplicate copies of data. This dedupability measure may indicate how often deduplication was performed, the sizes of stored data after deduplication, or how often deduplication metadata was updated, among other things. This dedupability measure may be highly indicative of a ransomware attack. For example, blocks encrypted by a particular type of ransomware may have low dedupability, as copies of the encrypted blocks are unlikely to already be stored in the system.

In certain embodiments, data characteristics include an entropy measure, i.e., a measure of the randomness of data. As the entropy of a block negatively correlates strongly with its compressibility, this entropy measure may be based on the amount of compression performed on data, indicating a size of stored data after compression or an amount of size reduction due to compression, among other things. For example, blocks encrypted by a particular type of ransomware may have high entropy, as these encrypted blocks are unlikely to be very compressible. Further details will now be provided with reference to FIG. 2.

Figure 2:
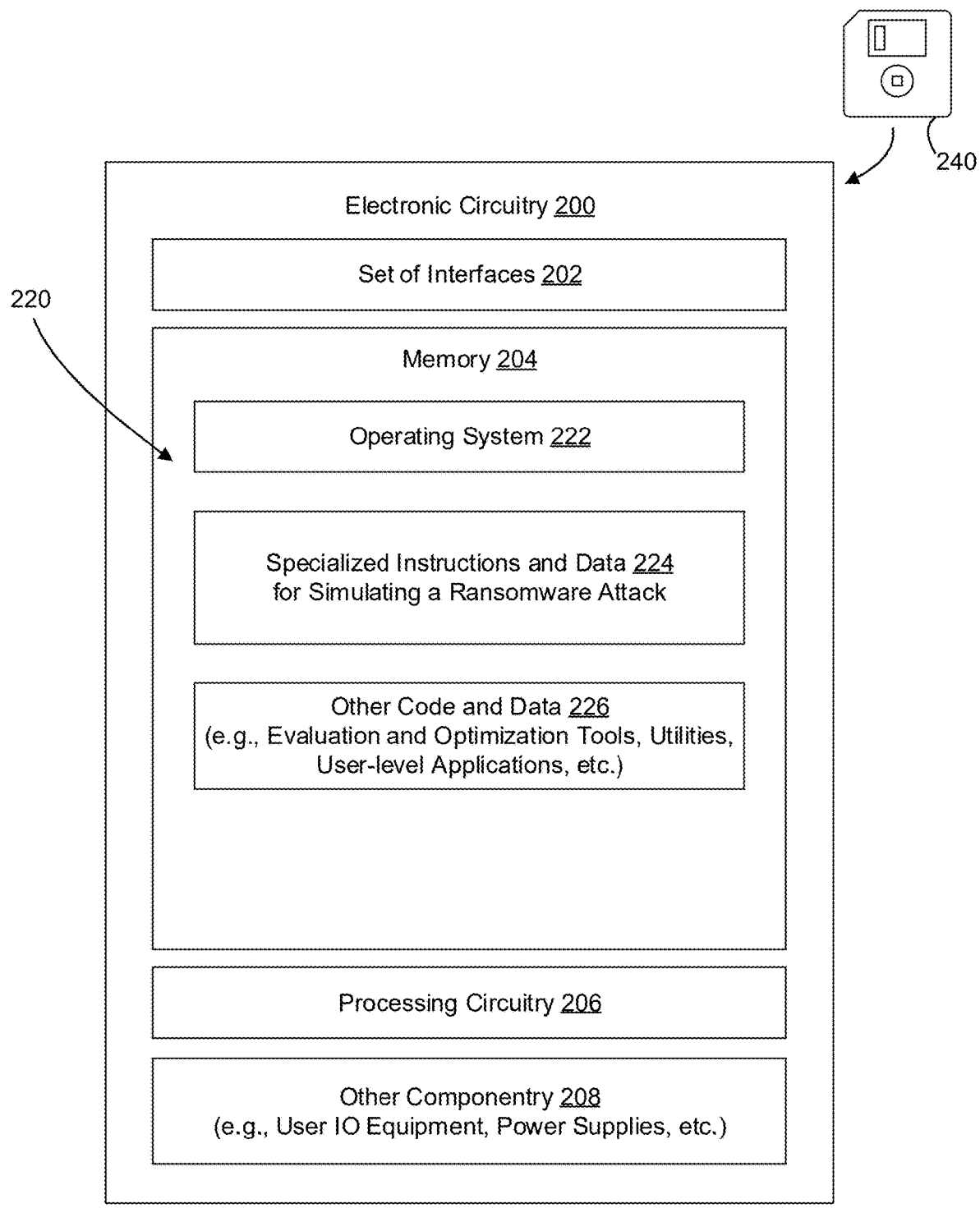
FIG. 2 is a block diagram of electronic equipment for the testing environment in accordance with certain embodiments.

FIG. 2 is a block diagram of electronic circuitry 200 which is suitable for at least a portion of the data storage equipment 104 (also see FIG. 1) in accordance with certain embodiments. The electronic circuitry 200 includes a set of interfaces 202, memory 204, processing circuitry 206, and other circuitry 208.

The set of interfaces 202 is constructed and arranged to connect the electronic circuitry 200 to the communications medium 106 (FIG. 1) to enable communications with other devices of the testing environment 100 (e.g., the host computers 102). Such communications may be IP-based, SAN-based, cellular-based, cable-based, fiber-optic based, wireless, cloud-based, combinations thereof, and so on. Additionally, the set of interfaces 202 is constructed and arranged to connect the electronic circuitry 200 other local equipment such as the set of storage devices 132. Accordingly, the set of interfaces 202 may include one or more host interfaces (e.g., a computer network interface, a fibre-channel interface, etc.), one or more storage device interfaces (e.g., a host adapter or HBA, etc.), and other interfaces. As a result, the set of interfaces 202 enables the electronic circuitry 200 to robustly and reliably communicate with various apparatus.

The memory 204 is intended to represent both volatile storage (e.g., DRAM, SRAM, etc.) and non-volatile storage (e.g., flash memory, magnetic memory, etc.). The memory 204 stores a variety of software constructs 220 including an operating system 222, specialized instructions and data 224, and other code and data 226.

The operating system 222 refers to particular control code such as a kernel to manage computerized resources (e.g., processor cycles, memory space, etc.), the IO stack (e.g., drivers), and so on. In accordance with certain embodiments, a simulated ransomware attack is based on IO traces acquired from a platform running a different OS than operating system 222. These IO traces record data characteristics that are not system dependent.

The specialized instructions and data 224 refers to particular instructions and data for performing a simulated ransomware attack. In some arrangements, the specialized instructions and data 224 is user configurable, e.g., to customize the loading, running, timing, or other aspects of the simulated ransomware attack. In some arrangements, the specialized instructions and data 224 further includes particular instructions and data for testing ransomware protection tools during the simulated ransomware attack. These ransomware protection tools may be configured to detect a ransomware attack and contain or otherwise mitigate its effects. In some arrangements, the specialized instructions and data 224 is tightly integrated with or part of the operating system 222 itself. The other code and data 226 refers to applications and routines to provide additional operations and services (e.g., performance measurement tools, etc.), user-level applications, administrative tools, utilities, and so on.

The processing circuitry 206 is constructed and arranged to operate in accordance with the various software constructs 220 stored in the memory 204. As will be explained in further detail shortly, the processing circuitry 206 executes the operating system 222 and the specialized instructions and data 224 to form specialized circuitry that robustly and reliably manages host data on behalf of a set of hosts. Such processing circuitry 206 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 240 is capable of delivering all or portions of the software constructs 220 to the electronic circuitry 200. In particular, the computer program product 240 has a non-transitory (or non-volatile) computer readable medium which stores a set of instructions that controls one or more operations of the electronic circuitry 200. Examples of suitable computer readable storage media include tangible articles of manufacture and apparatus which store instructions in a non-volatile manner such as DVD, CD-ROM, flash memory, disk memory, tape memory, and the like.

The other componentry 208 refers to other hardware of the electronic circuitry 200. Along these lines, the electronic circuitry 200 may further include special user IO equipment (e.g., a service processor), buses, cabling, adaptors, auxiliary apparatuses, other specialized data storage componentry, etc. Further details will now be provided with reference to FIG. 3.

Figure 3:
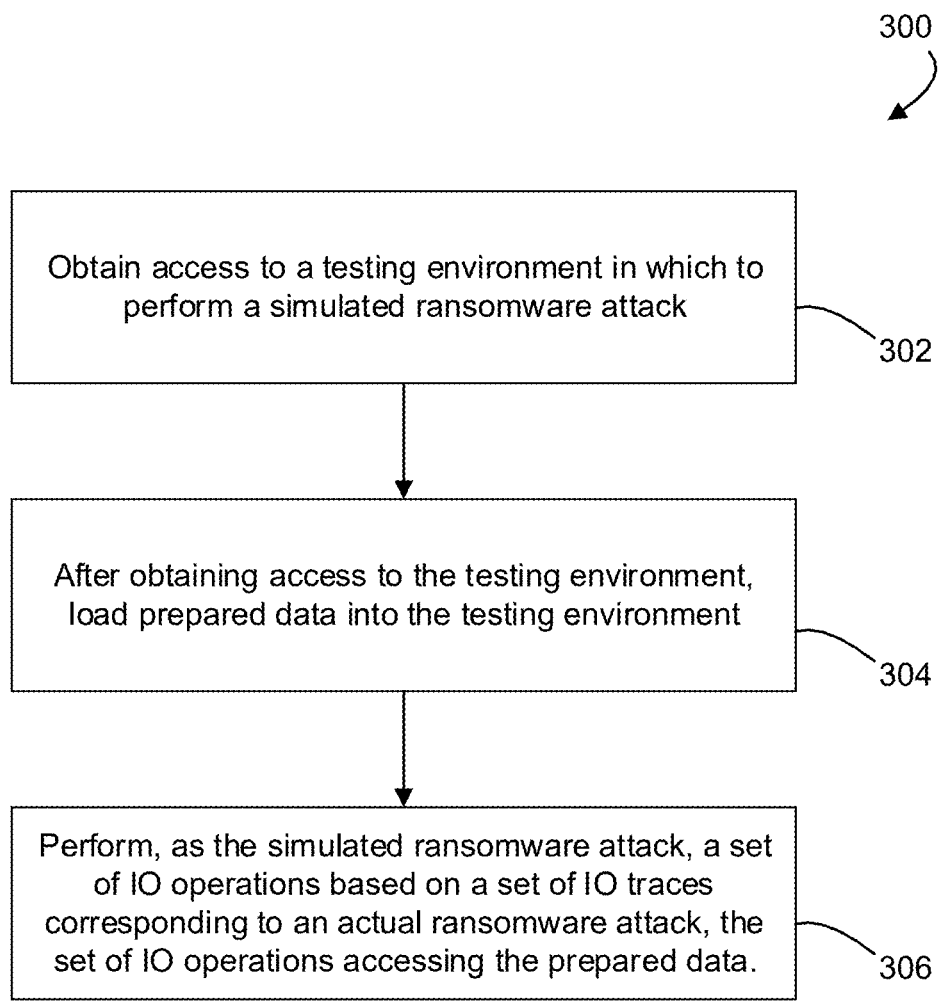
FIG. 3 is a flowchart of a procedure which is performed by specialized equipment in accordance with certain embodiments.

FIG. 3 is a flowchart of a procedure 300 which is performed by specialized equipment in accordance with certain embodiments. The procedure 300 carries out performance of a simulated ransomware attack based on a set of IO traces acquired during an actual ransomware attack.

At 302, the specialized equipment obtains access to a testing environment in which to perform a simulated ransomware attack. This testing environment may be, for example, testing environment 100.

At 304, after obtaining access to the testing environment, the specialized equipment loads prepared data into the testing environment. In certain embodiments, the prepared data simulates read data accessed during the actual ransomware attack. In these embodiments, the prepared data enables proper completion of read operations of the simulated ransomware attack. In certain embodiments, the prepared data is based on data characteristics (e.g., size, entropy, dedupability, etc.) recorded in the set of IO traces.

At 306, the specialized equipment performs, as the simulated ransomware attack, a set of IO operations that are based on the set of IO traces corresponding to the actual ransomware attack. In certain embodiments, storage processing circuitry 130 performs the simulated ransomware attack by servicing IO requests generated based on IO requests defined by the set of IO traces. In this manner, the specialized equipment performs the simulated ransomware attack without running potentially harmful ransomware. Further details will now be provided with reference to FIG. 4.

Figure 4:
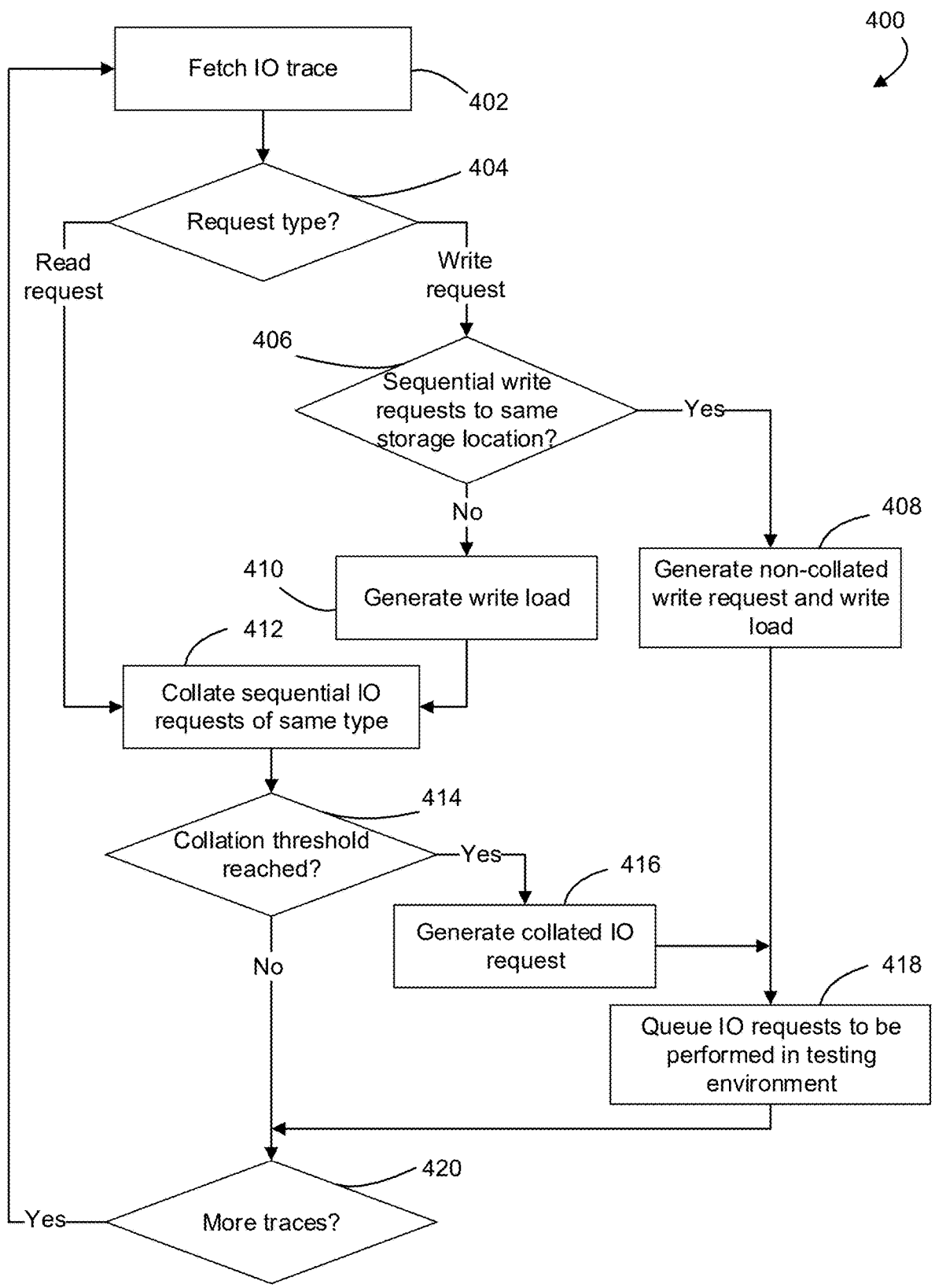
FIG. 4 is a flowchart of another procedure which is performed by specialized equipment in accordance with certain embodiments.

FIG. 4 is a flowchart of a procedure 400 that uses a set of IO traces to generate IO requests to be serviced when performing a simulated ransomware attack in accordance with certain embodiments. In some arrangements, an IO generator performs the procedure 400 separately from the testing environment and thereafter loads the generated IO requests into the testing environment. In other embodiments, the IO generator is integrated into the testing environment and may run simultaneously with the simulated ransomware attack.

At 402, the IO generator fetches an IO trace from the set of IO traces acquired during an actual ransomware attack. In certain embodiments, the IO generator fetches IO traces in chronological order. In certain embodiments, the set of IO traces is the same set of IO traces used to generate prepared data loaded prior to performing the simulated ransomware attack.

At 404, the IO generator establishes the type of request indicated by the fetched IO trace. If the request is a write request, then block 404 proceeds to block 406. However, if the request is a read request, then block 404 proceeds to block 412.

At 406, the IO generator establishes whether the write request indicated by the fetched IO trace is part of a plurality of sequential write requests directed to the same storage location. In certain embodiments, sequential IO requests may be simulated as a single, collated IO request to more efficiently manage processing resources, achieve more accurate timing, and so forth. However, when sequential write requests are directed to the same storage location, these certain embodiments generate separate, non-collated write requests to more accurately reflect what was written during the actual ransomware attack, rather than a single write reflecting only the last write to the storage location. In these situations, block 406 proceeds to block 408, in which the IO generator generates a non-collated write request and write load based on the fetched IO trace. Otherwise, block 406 proceeds to block 410, in which the IO generator generates a write load corresponding to the IO trace.

In certain embodiments, the write load includes input data that simulates data written during an actual ransomware attack. The IO generator may use the IO traces to generate the input data without needing access to user data written during the actual ransomware attack. Instead, the input data may be based on data characteristics (e.g., size, entropy, dedupability, etc.) recorded in fetched IO trace. In certain embodiments, these data characteristics are user configurable, e.g., to more efficiently utilize processor resources, to test particular features of a ransomware protection tool, and so forth.

At 412, the IO generator collates sequential IO requests based on the request type indicated by the fetched IO trace. As described above, a collated IO request simulates multiple IO requests in a single request to more efficiently manage processing resources, achieve more accurate timing, and so forth. In certain embodiments, the IO generator maintains the same order of access as the actual ransomware attack. In these embodiments, each collated IO request is based on multiple, sequential IO requests of the same type, e.g., the collated IO request may be a collated read request based on sequential read requests or may be a collated write request based on sequential write requests.

It should be appreciated that the order of access may be indicative of a ransomware attack. For example, some ransomware attacks involve repeatedly reading data of a data object, encrypting that data, and then writing the encrypted data back to the same data object.

At 414, the IO generator establishes whether a collation threshold is reached. In certain embodiments, the collation threshold is a predetermined size threshold, e.g., when the collated data meets or exceeds a certain size. In certain embodiments, the collation threshold is a predetermined timing threshold, e.g., when a certain amount of time has elapsed. If a collation threshold is not reached, then the IO generator establishes whether there are more IO traces to be processed, i.e., block 414 proceeds to block 420. However, if the collation threshold is reached, then block 414 proceeds to block 416.

At 416, the IO generator generates the collated IO request. At 418, the IO generator queues the IO requests to be performed in the testing environment. Procedure 400 may then be repeated until all IO traces are processed. Further details will now be provided with reference to FIG. 5.

Figure 5:
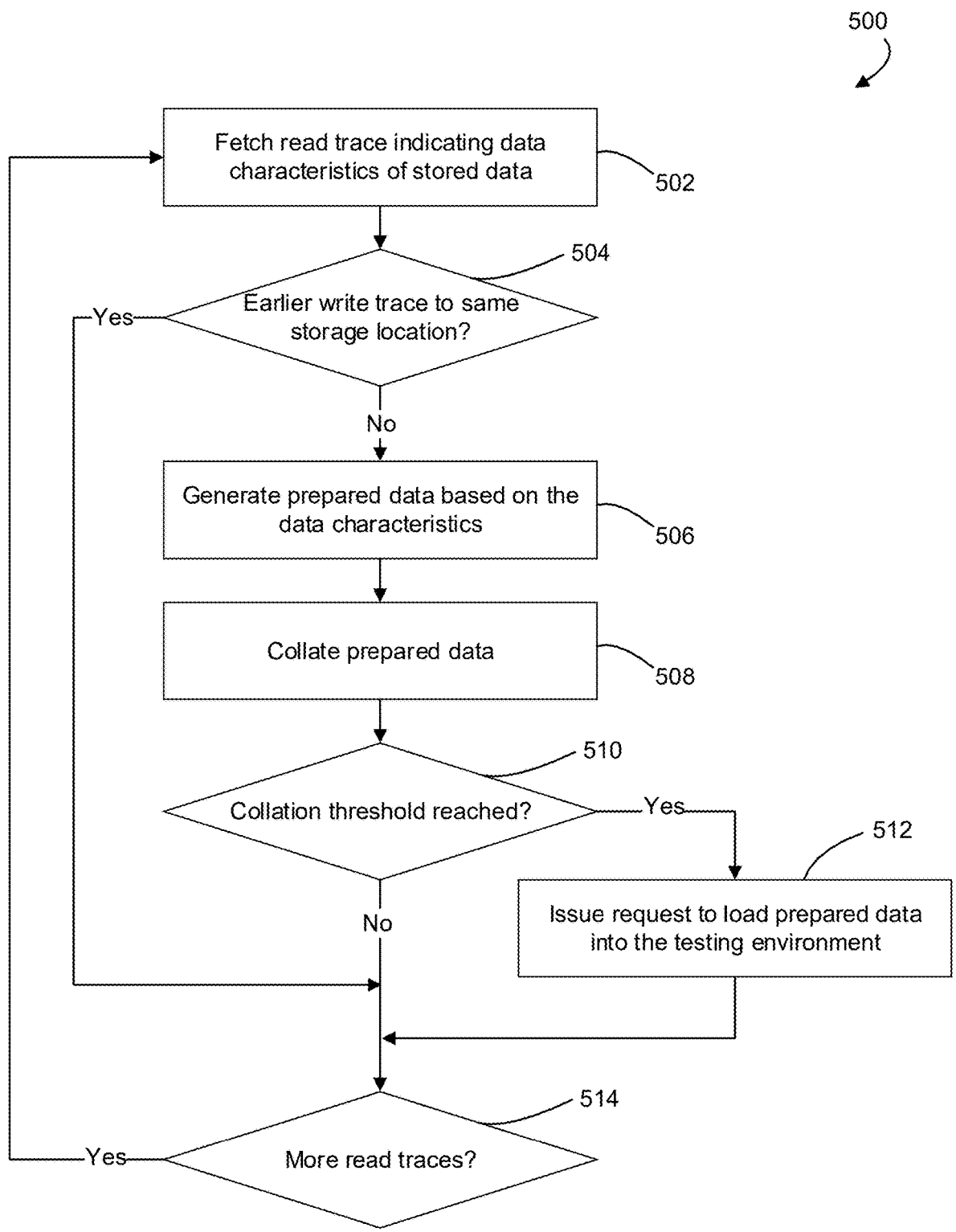
FIG. 5 is a flowchart of yet another procedure which is performed by specialized equipment in accordance with certain embodiments.

FIG. 5 is a flowchart of a procedure 500 that generates prepared data to be loaded into a testing environment in accordance with certain embodiments. In these certain embodiments, loading prepared data enables certain read operations to successfully complete during the simulated ransomware attack. In certain arrangements, read operations will not successfully complete unless data is stored at the storage locations specified by read operations. These read operations may access the prepared data to successfully complete.

In some arrangements, a volume generator performs the procedure 500 separately from the testing environment and thereafter loads the prepared data into the testing environment. In other embodiments, the volume generator is integrated into the testing environment.

At 502, the volume generator fetches a read trace indicating data characteristics of stored data. In certain embodiments, the fetched read trace is included in a set of IO traces used to generate the IO requests as described above in connection with FIG. 4. In certain embodiments, the volume generator fetches read traces in chronological order.

At 504, the volume generator establishes whether the set of IO traces includes a chronologically earlier write trace directed to the same storage location as the fetched read trace. If so, then volume generator may ignore the fetched read trace (i.e., block 504 proceeds to block 514). However, if not, then block 504 proceeds to block 506. In certain embodiments, the volume generator need not generate prepared data for the fetched read trace because the earlier write trace supports proper data access when performing the simulated ransomware attack. In these embodiments, a write load based on the earlier write trace may be written to a corresponding storage location. Later, a read operation based on the fetched read trace may successfully complete by accessing the stored write load.

At 506, the volume generator generates the prepared data based on the data characteristics (e.g., size, entropy, dedupability, etc.) indicated by the fetched read trace. In certain embodiments, the volume generator generates the prepared data without needing access to data accessed during the actual ransomware attack. Moreover, in certain embodiments, the prepared data is based on platform-agnostic data characteristics, enabling the prepared data to be used in a variety of testing environments. In certain embodiments, data characteristics of the prepared data are user configurable, e.g., to more efficiently utilize processor resources, to test particular features of a ransomware detection process, and so forth.

At 508, the volume generator collates data to combine the prepared data based on the fetched read trace with prepared data generated based on other read traces. Collating the prepared data enables the prepared data to be loaded in fewer operations and more efficiently manages processing resources.

At 510, the volume generator establishes whether a collation threshold is reached. In certain embodiments, the collation threshold is a predetermined size threshold, e.g., when the collated data meets or exceeds a certain IO size. In other embodiments, the collation threshold is a predetermined timing threshold, e.g., when a certain amount of time has elapsed. If a collation threshold is not reached, then the volume generator establishes whether there are more read traces to be processed, i.e., block 510 proceeds to block 514. However, if the collation threshold is reached, then block 510 proceeds to block 512.

At block 512, the volume generator issues a request to load the prepared data into the testing environment. This prepared data supports proper completion of read operations during the simulated ransomware attack.

As described above, improved techniques are directed to simulating a ransomware attack using traces of input/output (IO) activity (hereinafter "IO traces") acquired during an actual ransomware attack. These IO traces enable a simulator to perform a simulated ransomware attack without running the ransomware used in the actual ransomware attack. Instead, the simulator reads and writes data having data characteristics based on those recorded in the IO traces. These data characteristics may include size, entropy, dedupability, and other data characteristics indicative of the actual ransomware attack. Moreover, these data characteristics may be platform agnostic, enabling the simulator to perform a simulated ransomware attack regardless of the type of system affected by the actual ransomware attack.

One should appreciate that the above-described techniques do not merely collect and store data. Rather, the disclosed techniques involve simulating of a ransomware attack in a testing environment. Accordingly, such techniques provide for improved safety, accuracy, and flexibility when developing and testing ransomware protection tools.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the testing environment 100 such as the host computers 102, etc. are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

In some installations, the simulated ransomware attack may be performed by a ransomware simulator having a variety of modules, including a trace parser, write load generator, IO collator, volume prefiller, trace player, and IO driver.

The trace parser provides the ability to parse, and merge read and write trace files chronologically.

The write load generator applies transformation functions required to generate writes that satisfy entropy and deduplication specifications in the IO traces.

The IO collator collates small sequential reads and writes into larger writes where possible. This helps reduce the number of IOs issued to the storage system. Thresholds for collation time and IO size are configurable. Also, the order of access to blocks is preserved while individual requests are collated. For example, if a block is read, written, and later read back, the three IO requests are issued in separate collated requests while preserving the order.

The volume prefiller identifies reads for blocks that are not pre-written and generates writes to prefill the blocks. This is required to ensure that subsequent read from the block succeeds. The volume prefiller leverages the write load generator and IO collator to collate smaller writes into fewer large writes before issuing the write using the IO driver.

The trace player replays the traces in the dataset to simulate the attack. This module, too, leverages the write load generator and IO collator to collate smaller writes into fewer large writes before issuing the write using the IO driver.

The IO driver issues IO requests to the storage system.

In some installations, on start-up, the simulator prefills storage of the testing environment to simulate a base workload. This step ensures that reads to blocks that have not already been written to succeed. IO traces are then replayed to perform the simulated ransomware attack. Read and write traces are first analyzed to identify read requests to blocks that have not already been written to. The write load generator is used to generate data to be written to these blocks. These requests are then collated using the IO collator and issued to the storage system using IO driver.

In some installations, trace player iterates through read and write traces chronologically and generates read and write requests. The write load generator is used to generate writes that satisfy entropy and deduplication specifications in the write traces. These requests are then collated using the IO collator and issued to the storage system using the IO driver. Accordingly, the simulated ransomware attack may be performed in a safe and reliable manner.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document. Such modifications and enhancements are intended to belong to various embodiments of the disclosure.

The invention claimed is:

1. A method of simulating a ransomware attack, the method comprising:
   obtaining access to a testing environment in which to perform a simulated ransomware attack;
   after obtaining access to the testing environment, loading prepared data into the testing environment; and
   performing, as the simulated ransomware attack, a set of input/output (IO) operations based on a set of IO traces corresponding to an actual ransomware attack, the set of IO operations accessing the prepared data;
   wherein performing the set of IO operations includes:
   writing, in place of the prepared data, replacement data representing encrypted user data generated by the actual ransomware attack, the replacement data being based on the set of IO traces; and
   wherein the method further comprises:
   generating the replacement data based on data characteristics of the encrypted user data, the data characteristics being obtained from an IO trace of the set of IO traces, the IO trace describing a write request which was issued during the actual ransomware attack.

2. The method of claim 1, further comprising:
   obtaining, from the set of IO traces, an entropy measure of data written during the actual ransomware attack; and
   generating, based on the entropy measure, input data simulating the data written during the actual ransomware attack; and
   wherein performing the set of IO operations includes:
   writing the input data into storage of the testing environment.

3. The method of claim 1, further comprising:
   obtaining, from the set of IO traces, a deduplication measure of data written during the actual ransomware attack; and
   generating, based on the deduplication measure, input data simulating the data written during the actual ransomware attack; and
   wherein performing the set of IO operations includes:
   writing the input data into storage of the testing environment.

4. The method of claim 1 wherein the set of IO traces is acquired
   from a first platform running a first operating system (OS); and
   wherein performing the set of IO operations includes:
   performing the set of IO operations on, as the testing environment, a second platform running a second OS that is a different OS than the first OS.

5. The method of claim 1, further comprising:
   obtaining, from the set of IO traces, other data characteristics of read data stored prior to the actual ransomware attack; and
   generating the prepared data based on the other data characteristics to support proper access when performing a read operation based on the set of IO traces.

6. The method of claim 5 wherein obtaining the other data characteristics includes:
   obtaining, as a data characteristic, an entropy measure of the read data.

7. The method of claim 5 wherein obtaining the other data characteristics includes:
obtaining, as a data characteristic, a deduplication measure of the read data.

8. The method of claim 5 wherein the prepared data includes
multiple portions of data each based on a respective read request recorded in the set of IO traces;
wherein the method further comprises:
collating the multiple portions of data to generate a set of collated data; and
wherein loading the prepared data includes:
loading, as at least part of the prepared data, the set of collated data into the testing environment.

9. The method of claim 8 wherein collating the multiple portions of
data exceeds a predetermined collation threshold; and
wherein the method further comprises:
in response to exceeding the predetermined collation threshold, issuing a request to load, as at least part of the prepared data, the set of collated data into the testing environment.

10. The method of claim 1 wherein the set of IO traces
define a plurality of sequential IO requests issued during the actual ransomware attack; and
wherein performing the IO operations includes:
generating a set of collated IO requests having an order of access based on the plurality of sequential IO requests, the set of collated IO requests including fewer IO requests than the plurality of IO requests; and
issuing, during the simulated ransomware attack, the set of collated IO requests in the testing environment.

11. The method of claim 10 wherein the plurality of sequential IO
requests includes a plurality of sequential read requests; and
wherein generating the set of collated IO requests includes:
generating a collated read request based on the set of sequential read requests.

12. The method of claim 10 wherein the plurality of sequential IO
requests includes a plurality of sequential write requests; and
wherein generating the set of collated IO requests includes:
generating a collated write request based on the set of sequential write requests.

13. The method of claim 12 wherein write requests in plurality of
sequential write requests are directed to different respective storage locations;
wherein the sequential IO requests further include a second plurality of sequential write requests directed to a same storage location; and
wherein performing the set of IO operations further includes:
issuing multiple write requests to store write data of the second plurality of write requests.

14. The method of claim 10 wherein generating the set of collated IO requests includes:
collating the sequential IO requests to generate a collated IO request having an IO size exceeding a predetermined size threshold; and
in response to the IO size exceeding the predetermined size threshold, issuing the collated IO request in the testing environment.

15. Data storage equipment, comprising:
memory; and
control circuitry coupled to the memory, the memory storing instructions which, when carried out by the control circuitry, cause the control circuitry to perform a method of:
obtaining access to a testing environment in which to perform a simulated ransomware attack;
after obtaining access to the testing environment, loading prepared data into the testing environment; and
performing, as the simulated ransomware attack, a set of input/output (IO) operations based on a set of IO traces corresponding to an actual ransomware attack, the set of IO operations accessing the prepared data;
wherein performing the set of IO operations includes:
writing, in place of the prepared data, replacement data representing encrypted user data generated by the actual ransomware attack, the replacement data being based on the set of IO traces; and
wherein the method further comprises:
generating the replacement data based on data characteristics of the encrypted user data, the data characteristics being obtained from an IO trace of the set of IO traces, the IO trace describing a write request which was issued during the actual ransomware attack.

16. The data storage equipment of claim 15 wherein the method further comprises:
obtaining, from the set of IO traces, an entropy measure of data written during the actual ransomware attack; and
generating, based on the entropy measure, input data simulating the data written during the actual ransomware attack; and
wherein performing the set of IO operations includes:
writing the input data into storage of the testing environment.

17. The data storage equipment of claim 15 wherein the method further comprises:
obtaining, from the set of IO traces, a deduplication measure of data written during the actual ransomware attack; and
generating, based on the deduplication measure, input data simulating the data written during the actual ransomware attack; and
wherein performing the set of IO operations includes:
writing the input data into storage of the testing environment.

18. A computer program product having a non-transitory computer readable medium which stores a set of instructions to simulate a ransomware attack, the set of instructions, when carried out by computerized circuitry, causing the computerized circuitry to perform a method of:
obtaining access to a testing environment in which to perform a simulated ransomware attack;
after obtaining access to the testing environment, loading prepared data into the testing environment; and
performing, as the simulated ransomware attack, a set of input/output (IO) operations based on a set of IO traces corresponding to an actual ransomware attack, the set of IO operations accessing the prepared data;
wherein performing the set of IO operations includes:
writing, in place of the prepared data, replacement data representing encrypted user data generated by the actual ransomware attack, the replacement data being based on the set of IO traces; and
wherein the method further comprises:
generating the replacement data based on data characteristics of the encrypted user data, the data characteristics being obtained from an IO trace of the set of IO traces, the IO trace describing a write request which was issued during the actual ransomware attack.

19. The method of claim 1 wherein performing the set of IO operations further includes:
   prior to writing the replacement data, reading the prepared data from a particular storage location in the testing environment, the replacement data being written to the particular storage location in place of the prepared data.

\* \* \* \* \*